Feb. 24, 1953 L. HARTRIDGE 2,629,255
MACHINE FOR TESTING THE COMPONENT PARTS OF THE INJECTION
SYSTEMS OF COMPRESSION-IGNITION ENGINES
Filed June 30, 1948 7 Sheets-Sheet 1

Inventor
Leslie Hartridge
By
Attorney

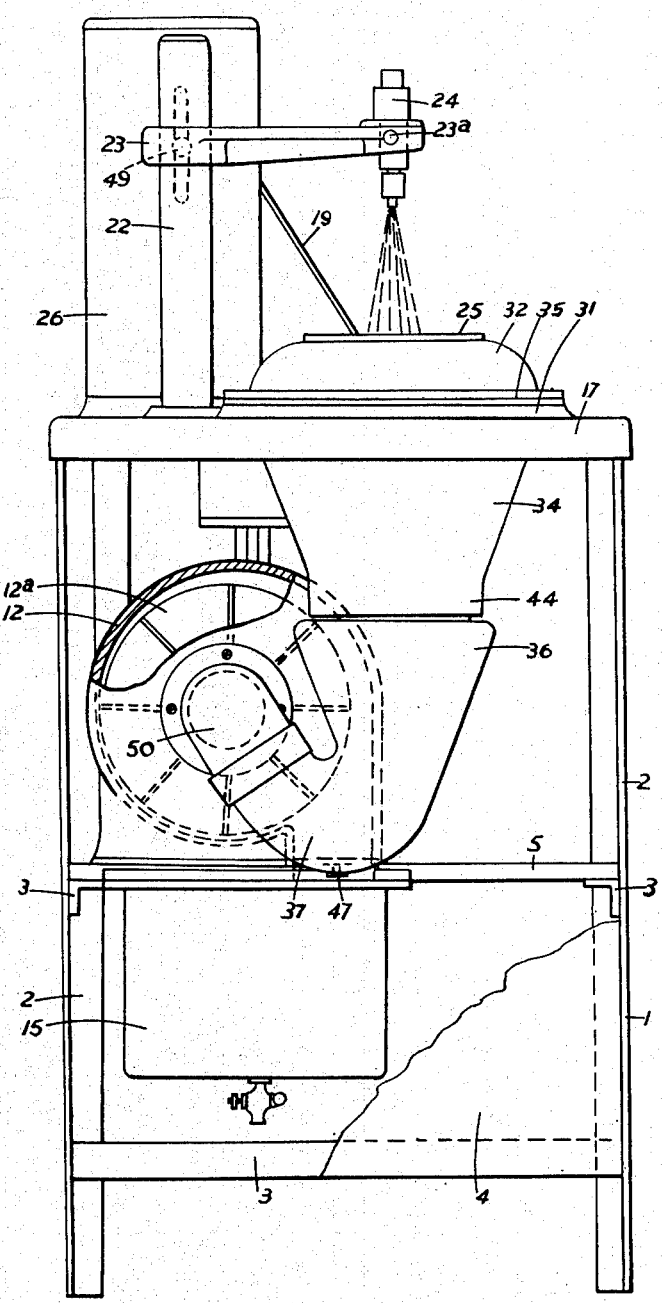

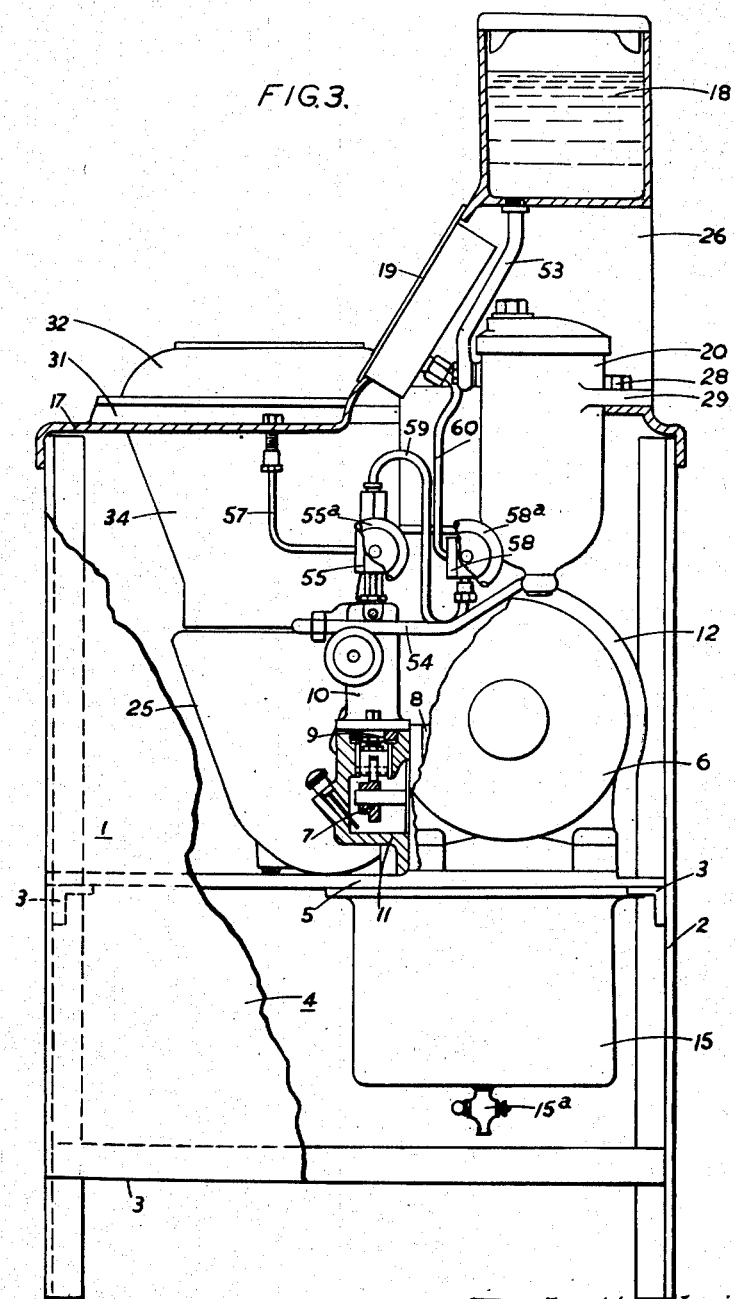

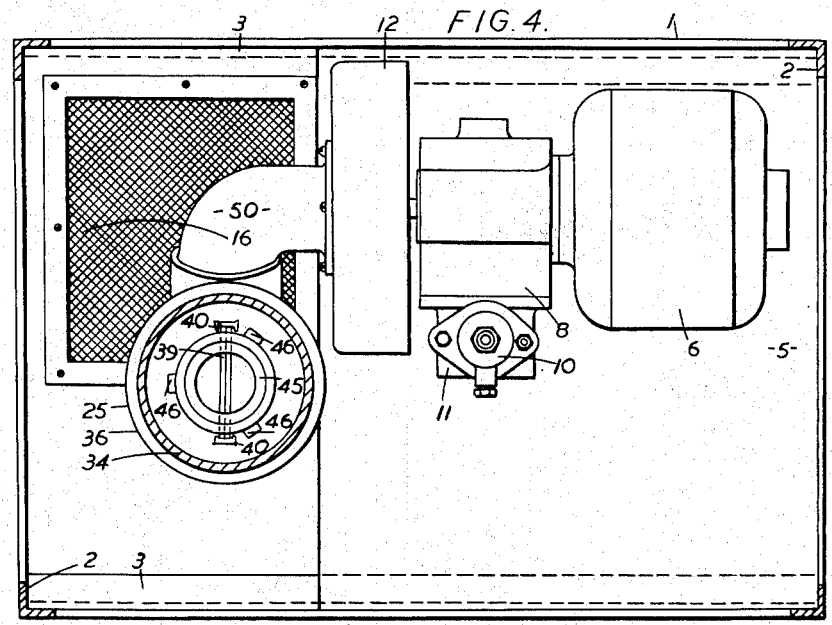
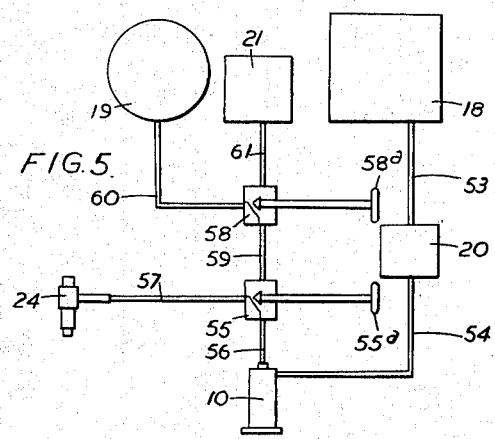
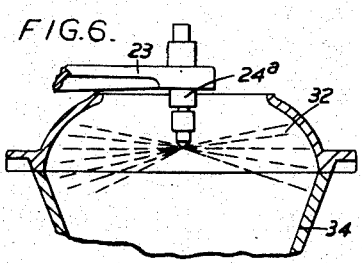

Feb. 24, 1953 L. HARTRIDGE 2,629,255
MACHINE FOR TESTING THE COMPONENT PARTS OF THE INJECTION
SYSTEMS OF COMPRESSION-IGNITION ENGINES
Filed June 30, 1948 7 Sheets-Sheet 5
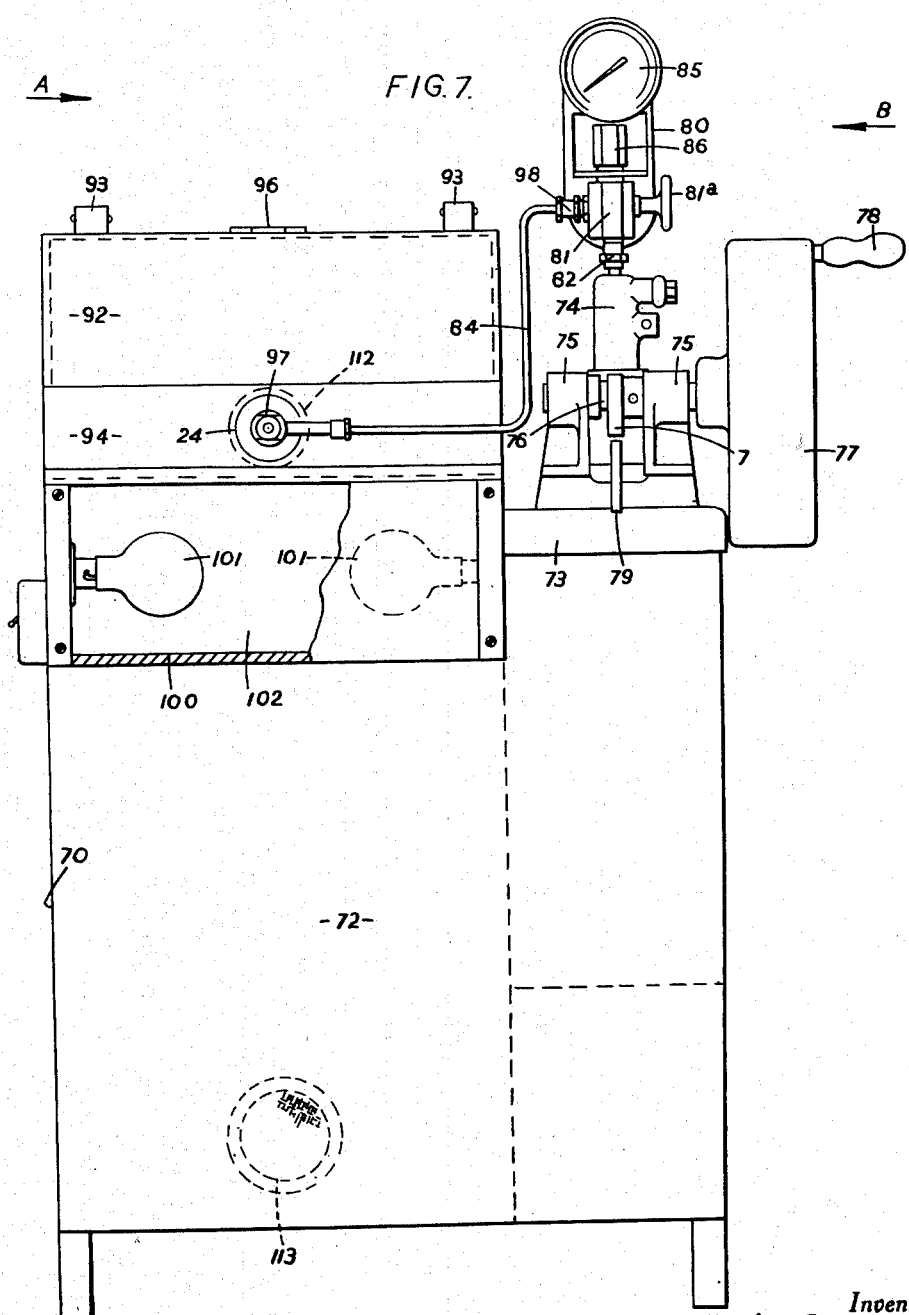
FIG. 7.
Inventor
Leslie Hartridge
By
Attorney

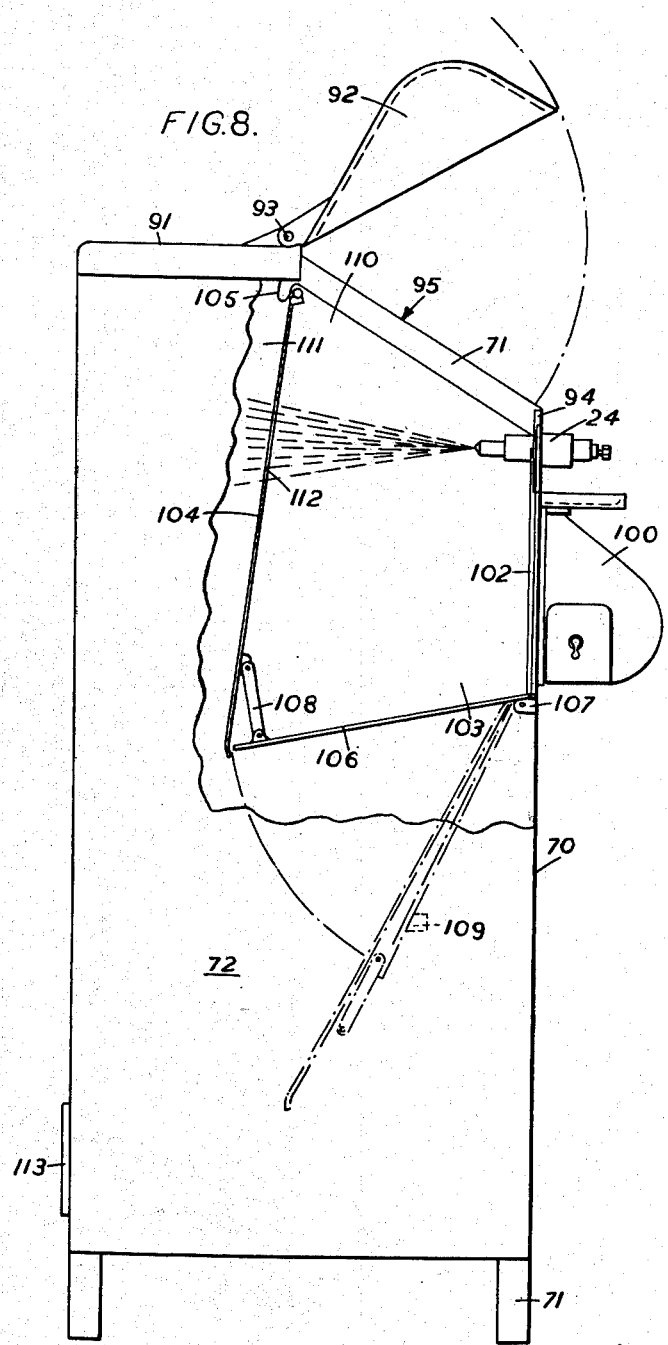

Feb. 24, 1953           L. HARTRIDGE           2,629,255
MACHINE FOR TESTING THE COMPONENT PARTS OF THE INJECTION
SYSTEMS OF COMPRESSION-IGNITION ENGINES
Filed June 30, 1948           7 Sheets-Sheet 7
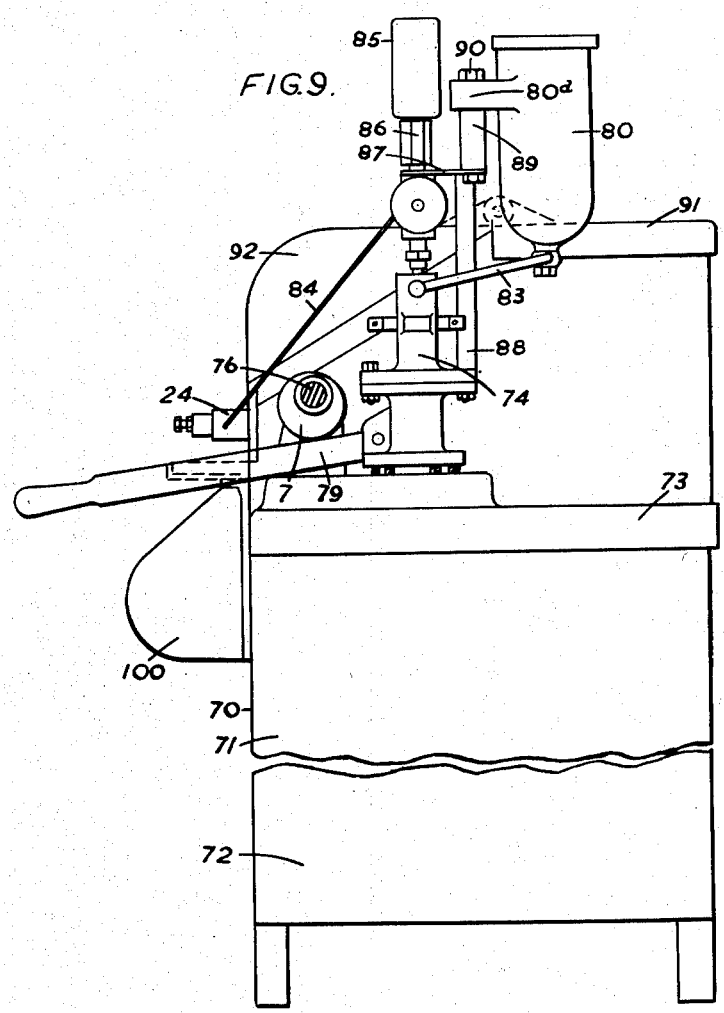
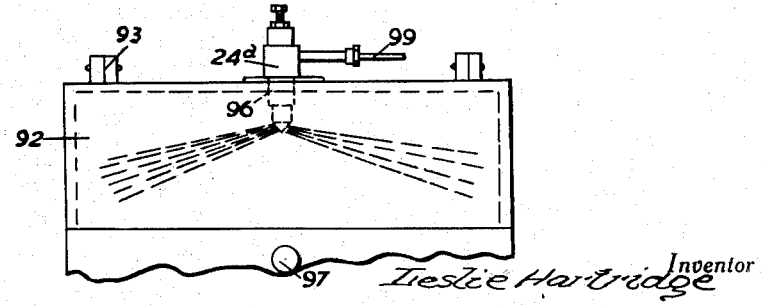

Patented Feb. 24, 1953

2,629,255

UNITED STATES PATENT OFFICE 2,629,255

MACHINE FOR TESTING THE COMPONENT PARTS OF THE INJECTION SYSTEMS OF COMPRESSION-IGNITION ENGINES

Leslie Hartridge, Buckingham, England

Application June 30, 1948, Serial No. 36,008
In Great Britain February 20, 1947

14 Claims. (Cl. 73—119)

This invention relates to a machine for testing the components of compression-ignition engines as to their behaviour under pressure, more particularly, for testing nozzles as to spray formation, nozzle opening pressures, "dry seat," and "pressure drop."

One object of the invention is the provision of a testing machine wherein test conditions are uniform and constant as distinct, for example, from known machines comprising a hand-lever operated fuel feed pump for an injector under test. In the known machines movement of the hand lever is of necessity jerky and the rate at which pressure is applied to the pump varies as the said rate depends largely on the force which the operator exerts on the hand lever.

A further object of the invention is the provision of a machine which will conform to a standard as to the rate (times per minute, for example) at which the injector is operated and to duration of injection.

According to the invention there is provided a machine for testing the injectors or nozzles of compression-ignition engines, comprising a cam-operated liquid feed pump, adapted to be connected to an injector to be tested, associated with means (e. g., a flywheel or a constant-speed electric motor) arranged to drive the cam at a steady speed of rotation, the machine being arranged to hold the nozzle so that spray is visible when issuing therefrom.

The surface of the cam lobe which effects reciprocation of the pump plunger preferably subtends an angle of from 90° to 110° at the centre of rotation of the cam and the said means preferably drives the cam at a steady speed lying between 80 and 90 R. P. M. In a typical case the subtended angle is approximately 100° and the rate of rotation about 85 R. P. M. A cam with such a profile and driven at such a speed will produce an injection operation on a standard pump substantially equivalent to the injection operation of the pump when driven by a standard engine cam at about 25 R. P. M. Effectively, the result in the case of 85 injections per minute will be equivalent to using the standard fuel pump cam of a small arc driven at 25 R. P. M., owing to the deletion of the time lag (when the pump is not pumping. A further advantage of the larger arc is that it produces a steadier build-up of pressure, which is a more advantageous condition for the tests of the injection. A further advantage is that by the greater number of injections per minute, inspection of the formation of the spray etc., is materially assisted. It is also an advantage that the larger cam profile can be more accurately manufactured due to its larger operating area.

In order to enable a "dry seat" test to be carried out an hydraulic accumulator or pressure chamber and a pressure gauge may be incorporated either in the hand driven machine or in the power driven machine and a suitable valve or suitable valves is or are provided to enable the accumulator and the gauge to be brought into and out of use as desired. When the accumulator and the gauge are in use the fuel pump forces fuel into the accumulator and to the injector; the gauge is connected to the pressure chamber. When the test is made the cam is rotated to bring the fuel pressure acting on the injector to the desired value, which is lower than the pressure at which the injector is set to open, and then the cam is stopped. Owing to the hydraulic accumulator the said pressure is held (for the purpose of the test) whether or not there is leakage at the nozzle seat or elsewhere. Leakage or bleeding, if present, at the nozzle seat will become apparent by the formation of a globule or liquid bead at the injector orifice.

A power-operated machine and a hand operated machine will now be described with reference to the accompanying drawings wherein:

Fig. 2 is an end elevation of the machine from the left thereof, parts being broken away;

Fig. 3 is an end elevation of the machine from the right thereof, parts being broken away;

Fig. 4 is a plan view in the plane indicated by the line IV—IV, Fig. 1;

Fig. 5 is a diagram of the pipe connections of the said machine;

Fig. 6 is a detail showing how a multi-hole nozzle can be tested in the machine (Figs 1 and 2 showing a single hole injector under test);

Fig. 7 is a front elevation of a hand operated machine with a part broken away to expose details;

Fig. 8 is a left-hand end elevation of the machine shown in Fig. 7, a part of the case being broken away;

Fig. 9 is a right-hand end elevation of the said machine; and

Fig. 10 is a detail showing how a multi-hole injector may be tested vertically as distinct from the horizontally tested, single-hole injector shown in Figs. 7, 8 and 9.

Figure 1:
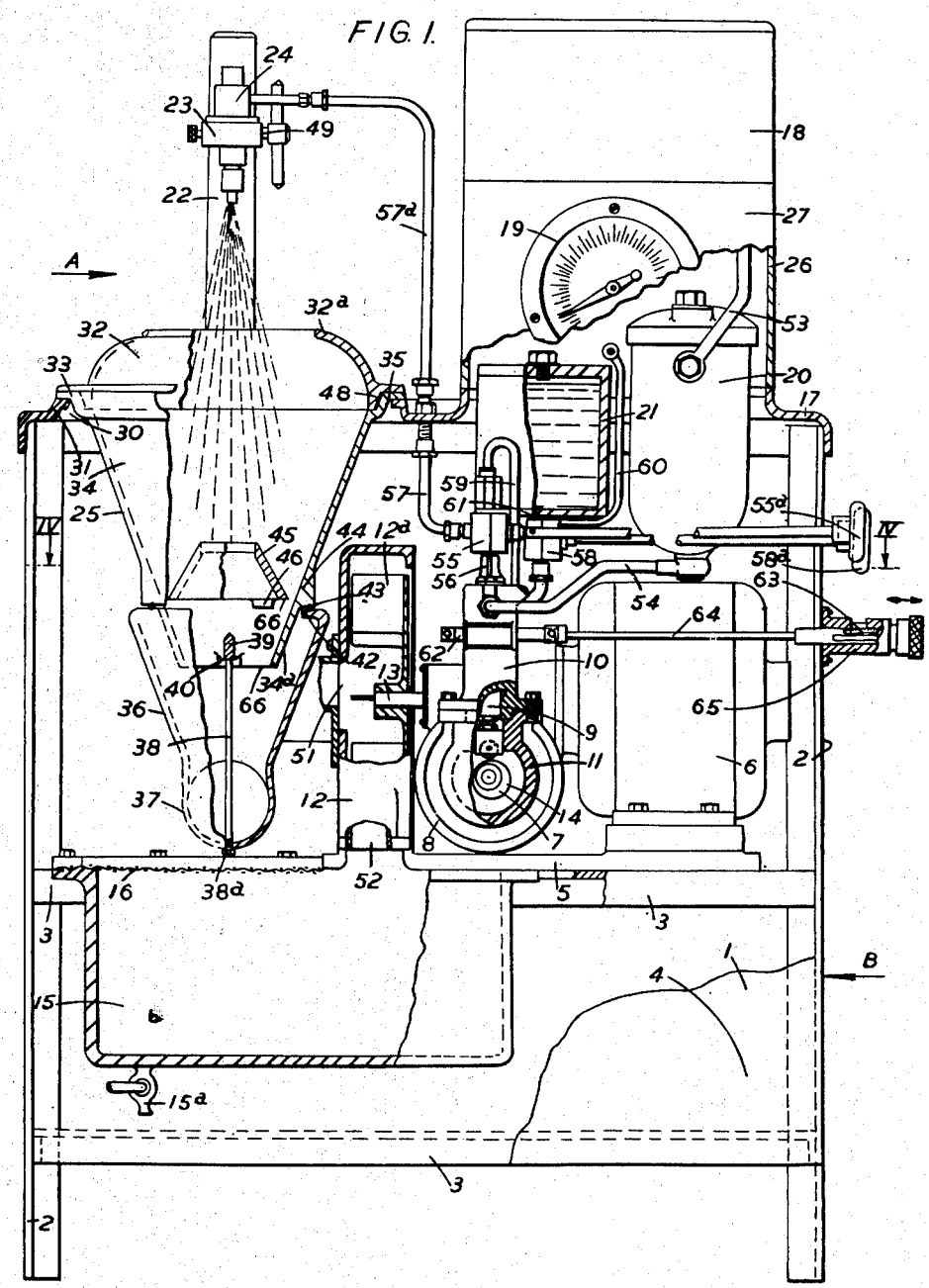
Fig. 1 is a front elevation of a power-operated machine with parts broken away and parts in section to expose details.

The machine shown in Figs. 1 to 4 comprises a rectangular case 1 formed by angle uprights 2, stretchers 3 and sheet metal plates 4.

A platform 5 at about the centre horizontal plane of this structure, said platform resting on the middle stretchers 3, carries a constant speed electric motor 6 adapted to drive a cam 7 through reduction gearing enclosed in a box 8 in known manner. The cam reciprocates the plunger 9 of a pump 10, the pump being mounted on the box 11 enclosing the cam and bearing the foot of the plunger, and the said box 11 being rigid with gear box 8. Hence, the platform supports the pump, the cam box and reduction gearing as well as the motor. The platform also carries an exhauster 12 driven by an extension 13 on the shaft of the motor.

The cam has a profile 14 the operative run of which i. e., the portion which lifts the pump plunger and allows it to fall, subtends an angle of from 90° to 110° at the centre of rotation of the cam.

The platform 5 is located towards one end of the middle stretchers; a waste tank 15, the function of which will be described, is supported from the middle stretchers and has its mouth, which is covered by filter gauze 16, between the left hand end of the case and the left hand end of the platform.

A top plate 17 directly or indirectly supports the majority of the remaining components of the machine. That is to say, the top plate supports a liquid tank 18, a pressure gauge 19, a filter and pressure accumulator 20 and 21, respectively, these components being at the right hand end of the top plate, a column 22 adjustably supporting a bracket 23 adapted to carry the nozzle 24 to be tested, and a spray receptacle and liquid extractor generally indicated by 25.

The fuel tank 18 is at the top of a hollow casting 26 attached to the top plate in any suitable manner; this casting lies towards the rear. The front edges of the flanks of the casting are inclined; these have the mounting plate 27, of the pressure gauge fixed to them. The top plate is open beneath the liquid tank; the upper part of the filter 20 enters the hollow of the casting towards the right hand side thereof and the bottom thereof enters the case above the motor. Studs as 28 passing through fixing lugs as 29 on the case of the filter 20 and engaging the top plate hold the filter in position. The pressure accumulator 21 lies beneath the tank to one side of the filter 20; it is fixed to the top plate 17 by studs and lugs, not shown, comparable with the studs 28 and lugs 29, respectively.

In the left hand half of the top plate is a circular opening 30 defined by a raised lip 31. The spray receptacle and liquid extractor 25 are suspended from this lip whilst a funnel rim or ring 32 of increasing diameter towards its base removably rests on the lip 33 of the top element 34 of the assembly 25. This element is hollow, of inverted, frusto-conical or funnel form and has an external flange 35 at its largest diameter which rests on the lip 31. A second hollow element, 36, of inverted frusto-conical or funnel form lies beneath the element 34; its top receives the lower end 34a of the element 34 in spaced relation to its sides and its bottom is of elbow form 37. A suspension rod 38 depending from a bridge 39 resting in recesses in the tops of lugs 40, which lugs are diametrically opposite each other in the bottom of the element 34, secures the element 36 to the element 34, the bottom of the rod passing through the bottom of the elbow 37 and receiving a fixing nut 38a, and the top of the element 36 having an inwardly directed flange 42 which butts against a compressible sealing ring 43 at the bottom of an annular swelling 44 on the element 34. Within the element 34 is a hollow, frusto-cone 45. The base does not reach the inner surface of the element 34; it rests on lugs 46 cast in this element. A drain-off 47 which lies over the filter gauze 16 is located at the bottom of the elbow 37.

It will be seen that the lip 33 of the element 34 is stepped; an annular flange 48 on the rim or ring 32 lies within the step. This arrangement locates the ring but does not hinder its removal and replacement.

The column 22 upstands from the top plate to the rear of the lip 33. The bracket 23, slidable on the column, can be set at any desired height thereon and releasably fixed by a screw 49. This bracket removably carries the nozzle 24 co-axially of the assembly 25, said bracket having a thumb nut 23a for securing the nozzle in position.

A second elbow 50, joined to the elbow 37, connects the elbow 37 to the exhauster intake 51. The exhauster delivery is indicated at 52, Fig. 1; it will be seen that it opens to the tank 15. Air from the exhauster, therefore, enters the tank and then leaves it through the gauze 16, said air being filtered thereby before it escapes to the interior of the case and thence to atmosphere. This function of the gauze is additional to its filtering function on liquid which drips from the drain-off 47 and enters the tank, as will be described.

Liquid flows from the tank 18 to the liquid filter 20 by way of a pipe 53, flows from the filter to the pump by way of a pipe 54 and flows from the pump to a first control valve 55 by way of a nipple 56. The liquid flows to the injector 24, whether the valve be opened or "closed," through a pipe 57 having a flexible run 57a, the valve being of the known type which always has one of two passages open but can be operated to open or to close the second passage. The second passage is connected to a two-way valve 58 of the known type by means of a pipe 59, which valve can be operated to close both outflow passages or to open the first and close the second. The first passage of the second valve is connected to the pressure gauge by the pipe 60 and the second passage of the said valve is connected to the pressure accumulator by a nipple 61, the nipple securing the valve to the pressure accumulator.

The pressure accumulator is a chamber or box filled with liquid save for a cushion of air which is compressed at the top of the liquid.

A pump-output control rack 62 operated in conjunction with a scale 63 is provided on the pump, said rack being operated by a rod 64 accessible from the right hand end of the case 1 and supported by a guide 65 on the case. It will be seen that the rod bears the scale and the guide carries the datum line. The rod-operated rack control for the pump is substantially comparable with the known control for the pumps of compression ignition engines, the pump being of substantially standard type.

When a test is to be made the injector, as 24, to be tested is applied to the bracket 23 and the motor is started. This causes the pump to force liquid through the injector nozzle and causes the exhauster to suck air through the mouth of the ring 32. If the spray jet spreads over the lip 32a of the ring 32 the bracket is lowered until all the spray enters the ring and, therefore, the spray receptacle and liquid extractor 25. The bracket will be located as high as possible, consistent with all the spray entering the ring, in order to expose as much of the spray as possible to view. If the injector be of multi-hole type, as indicated at 24a, Fig. 6, the bracket will be positioned on the column 26 to locate the discharge end of the injector within the ring as shown in this figure.

For spray tests the valve 55 will be set by means of its operating handle 55a, which is accessible from the right hand end of the machine, to prevent liquid from flowing to the valve 58, whilst the valve 58, by means of its handle 58a adjacent to the handle 55a, will be fully closed. Atomised liquid, by the action of gravity and by the current of air sucked into the assembly 25 through the mouth of the ring by the exhauster, will condense on the walls of the elements 34, 36 and 45 (and the wall of the element 32 if the nozzle is of the type shown in Fig. 6) and will flow through the drain-off 47 into the tank 15, said liquid gravitating down the inner surfaces of the elements and readily dripping off the upper elements 34 and 45 because the bottoms of these elements have sharp edges 66. The top the bridge 39 is of knife-edge form to assist the flowing-off therefrom of collected liquid. The sealing ring 43 and the elements 42 and 44 forming a joint therewith prevents the inflow of air at the joint. Air passing through the assembly 25 and thence to the exhauster will, of course, be liquid-laden. A good deal of the liquid will be deposited on the surfaces of the elements 34, 36 and 45, the element 45 preventing the main body of air from passing through the assembly without sweeping a condensing surface, whilst the centrifugal action of the rotor 12a of the exhauster will caues the liquid still remaining in the air by the time it reaches the exhauster to condense and the condensed liquid will flow into the tank 15. It is for this reason that the exhauster delivery communicates with the tank. Liquid collected in the tank can be drawn off as necessary through the cock 15a.

For some types of nozzles the ring 32 will not be required; it is easily removable for this reason, the flange 48 loosely entering the mouth of the cone 34. The mouth of the ring 32 is large enough to ensure that inflowing air does not materially alter the shape of the spray.

If it be desired to refer to the pressure gauge 19 in the spray tests the valves 55 and 58 are operated to enable liquid under pressure from the pump to effect the gauge.

For "dry seat" tests the valves 55 and 58 are operated to include both the pressure gauge and the accumulator 21. Once pressure is built up in the said accumulator to the point immediately preceding nozzle operation, as indicated by the gauge, the motor is stopped. The rate at which the gauge pressure drops is an indication of the degree of tightness of the nozzle seat. If the nozzle seat becomes wet this is shown by the formation of a liquid globue thereat.

For a "pressure drop" test, that is to say, a test determining the ability of an injector to hold the pressure of liquid in it and in the feed pipe to it, pressure is built up in the accumulator 21 as in a "dry seat" test, the pressure being indicated by the gauge, but then the valve 58 is operated to cut the accumulator out. The test commences at this instant; any pressure drop owing to injector leakage will be indicated by the gauge. If the pressure is held for the requisite time, say ten seconds, the injector passes the test.

A suitable speed for the cam during the above described tests is 85 R. P. M. because, having regard to the comparatively large arc of the profile 14, the operative period of the profile during each revolution is approximately equivalent to the length of time of injection operation of a standard pump cam which has a much smaller arc driven at a much lower speed, say 25 R. P. M.

The hand-operated machine will now be described with reference to Figs. 7 to 10.

The machine comprises a case 70 formed by a frame 71 and, in the main, sheet metal panels 72. A platform 73 at the right hand side of the upper part of the case supports a pump 74, comparable with the feed pump used in standard, hand-operated testing apparatus, and the bearings 75 for a cam shaft 76. The shaft bears a cam 7 similar to the cam 7 shown in Figs. 1 and 3 and has a flywheel 77 at its right hand end, said flywheel being provided with a driving handle 78. The mass and diameter of the flywheel is such that a rate of 85 R. P. M. is attained by the flywheel when it is turned at an easy normal speed. A typical flywheel weighs 60 lbs. and has a diameter of 12.5 inches.

The cam when rotated depresses the usual, spring-returned hand lever 79 of the pump and, therefore, operates the pump.

The pump receives liquid from a liquid supply tank 80, incorporating a filter, and delivers it to a valve 81 which is mounted on the pump by the connecting nipple 82. The connecting pipe between the tank and the pump is indicated by 83. The valve is of two-way type; one of its passages which is always open, is connected to a pipe 84 and the other passage, which may be opened or closed at will by means of the handle 81a, is connected to a pressure gauge 85. A coupling 86 provides the said connection.

The coupling 86 is secured to a bracket 87 which, in turn, is secured to a fixing bracket 88 rigidly upstanding from the pump case. The brackets 87 and 88 support the pressure gauge, and therefore by means of a column 89 on the bracket 87, support the member 80, said member being secured to the column by a bolt 90 passing through a lug 80a on the said member.

The case extends above the platform 73 at the left hand end thereof; the top of the extending part has a horizontal panel 91 at its rear and a hood 92 at its front, said hood being hinged to the panel 91 at 93 and comprising transparent plastic or the like.

The panel 91 and a narrow horizontal panel 94 immediately beneath the opening 95 which the hood normally closes, are provided with holes 96 and 97, respectively, for the application to the machine of a nozzle to be tested. The pipe 84 enables the valve 81 to be connected to an injector, such as the injector 24, when mounted in the hole 97. The coupling 98 between the valve and this pipe is of readily detachable type to enable the substitution for the pipe 84 of a pipe 99 (Fig. 10) suitable for connecting the valve to an injector when mounted in the hole 96.

Immediately beneath the panel 94 is a housing 100 for lamps 101, said housing being glazed at 102 to enable light from the lamp to pass to the chamber 103 formed by the interior of the case 70 but to prevent spray in the interior from entering the housing.

Within the chamber 103 is a hinged baffle. This comprises a cross partition 102 releasably caught up at its top by hooks as 105 at the front of the panel 91, and a cross partition 106 hinged at its front to lugs 107 at the bottom of the lamp housing. The lower end of the partition 104 is hinged to the rear end of the partition 106 by links 108; and the dimensions of the partitions are such that when the latter are in the full line position shown in Fig. 8 the partitions incline downwardly and rearwardly, as shown. The partitions may be lowered to the dotted line positon shown in Fig. 8 following unhooking of the panel 104, the links 108 permitting the partitions to fold together. A stop 109 fixed to a side of the case provides a rest for the folded partitions.

When the partitions are in the full line position they divide the chamber 103 into compartments 110 and 111. Spray from the injector shown in Fig. 8 can be observed in the compartment 110 through the hood 92. The spray passes to the compartment 111 through a hole 112 in the partition and finally condenses. The condensate may be collected by any suitable means at the base of the chamber 103. An air vent 113 is provided at the back of the chamber.

The object in providing the partitions is, as will be evident, to trap clouds of spray in the compartment 111 so as to isolate them from the zone in which the spray from the injector is to be observed, the hole 112 being co-axial with the hole 97 for the nozzle.

For a simple spray inspection test the valve 81 is operated to prevent liquid pressure from effecting the pressure gauge. For a dry seat test the valve is operated to allow liquid pressure to operate the gauge; the flywheel is turned until the pressure indicated by the gauge is just below the pressure at which the injector is set to spray and the injector nozzle is examined for bleeding. The hood 92 enables access to be gained to the nozzle so that it may be wiped for this test.

If the nozzle is of multi-hole type (24a, Fig. 10) the partitions 104 and 106 are lowered to the dotted line position shown in Fig. 8 and the nozzle is fitted to the hole 96 and connected to the valve 81, see Fig. 10. It will be evident that the hinged hood can be raised to give access to the chamber 103 during nozzle fitting and removal and during the tests, and to give access to the partitions.

What I claim is:

1. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, an exhauster and means for driving same, said receptacle including a substantially vertical funnel positioned relative to said support to receive at the wider end thereof the spray from the injector that is held by said support, and a connection between the intake of said exhauster and the narrow end of said funnel.

2. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, an exhauster, said receptacle including a first upright funnel and a second upright funnel, said first funnel being positioned relative to said support to receive at the wider end thereof the spray from the injector that is held by said support, the narrow end of said first funnel dipping into the mouth of said second funnel, a substantially horizontal ring located in said first funnel in spaced relation to the inner surface of said first funnel, the extremity of said narrow end having a sharp edge and the bottom of said ring having a sharp edge, and a connection between the intake of said exhauster and the narrow end of said second funnel.

3. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, an exhauster, said receptacle including a first upright funnel and a second upright funnel, said first funnel being positioned relative to said support to receive at the wider end thereof the spray from the injector that is held by said support, the narrow end of said first funnel dipping into the mouth of said second funnel, a substantially horizontal ring located in said first funnel in spaced relation to the inner surface of said first funnel, a sealing joint between said first funnel and said second funnel, the extremity of said narrow end having a sharp edge and the bottom of said ring having a sharp edge, and a connection between the intake of said exhauster and the narrow end of said second funnel.

4. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, an air exhauster and means for driving same, a waste tank, a connection between said receptacle and the intake of said air exhauster to draw air and spray liquid through said receptacle, and a connection between said waste tank and the delivery of said exhauster, said last mentioned connection opening to said waste tank at the top thereof.

5. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, said receptacle comprising walls defining a chamber, a partition member, said partition member dividing said chamber into two spray compartments, a transparent window for one compartment, said injector support being positioned for supporting the injector to deliver spray into said compartment having said transparent window, said partition member having an opening, said opening being located to permit of the passage of said spray therethrough into the other compartment whereby said partition isolates the spray passing into said other compartment from returning or drifting back into the one compartment, said opening being of a size at least as large as the cross-section of the projected spray and said other compartment being of a size to accept the spray.

6. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, said receptacle comprising walls defining a chamber, a partition member, said partition member dividing said chamber into two spray compartments, a transparent window for one compartment, said injector support being positioned for supporting the injector to deliver spray into said compartment having said transparent window, said partition member having an opening, said opening being located to permit of the passage of said spray therethrough into the other compartment whereby said partition isolates the spray passing into said other compartment from returning or drifting back into the one compartment, said opening being of a size at least as large as the cross-section of the projected spray and said other compartment being of a size to accept the spray and means for illuminating said compartment having said transparent closure member.

7. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, said receptacle comprising walls defining a chamber, a partition member, said partition member dividing said chamber into two compartments, a transparent window for one compartment, said injector support being positioned for supporting the injector to deliver spray into said compartment having said transparent window, said partition member having an opening, said opening being located to permit of the passage of said spray therethrough, and said partition member comprising a plurality of sections, means for collapsing said sections, means in said machine for supporting the collapsed sections in an out-of-the-way position whereby said chamber is unpartitioned.

8. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, said means for driving the cam at a steady speed of rotation comprising a constant speed electric motor, an air exhauster, a drive transmission between said motor and said exhauster, and a connection between said receptacle and the intake of said air exhauster to draw air and spray liquid through said receptacle.

9. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a receptacle for the reception of the spray from the injector undergoing test, said receptacle having its mouth at its top, a removable rim for said receptacle and positioned relative to said support to receive the spray from the injector that is held by said support, said rim being wider at its bottom than at its top, said bottom fitting said mouth.

10. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a pressure gauge, means for connecting said pump to said gauge, a pressure accumulator, means for connecting said pump and said gauge to said pressure accumulator, and two control valves, one of said valves being operable to isolate the pressure gauge and the liquid accumulator from the pump and the injector undergoing test and the second valve being operable to isolate the liquid accumulator only from the said pump and the said injector.

11. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a case, a top plate thereon, a platform between said top plate and the bottom of the case, said liquid feed pump, said cam and said means for driving the cam being mounted on said platform, said support being mounted on said top plate to locate the injector undergoing test above said top plate, and a receptacle for the reception of spray from the injector, said receptacle being mounted on said top plate with its mouth vertically beneath said support for the injector, a liquid feed tank mounted on said top plate, a pressure gauge and a pressure accumulator mounted on said top plate, a pipe connection between said feed tank and the intake of said pump, a connection between the delivery of said pump and said pressure gauge and said pressure accumulator and two control valves the first of said valves being operable to isolate the pressure gauge and the liquid accumulator from the pump and the injector undergoing test and the second valve being operable to isolate the liquid accumulator only from the said pump and the said injector.

12. A machine for testing injectors or nozzles for compression ignition engines, comprising a liquid feed pump, a cam for operating the pump, means for driving the cam at a steady speed of rotation, a support for holding an injector to be tested to expose to view the spray that issues from the injector, means for connecting said pump to the injector held by said support, a case, a top plate thereon, a platform between said top plate and the bottom of the case and said liquid feed pump, said cam and said means for driving the cam being mounted on said platform, said support being mounted on said top plate to locate the injector undergoing test above said top plate, and a receptacle for the reception of spray from the injector, said receptacle being mounted on said top plate with its mouth vertically beneath said support for the injector, an exhauster, a flow connection between the intake of said exhauster and the interior of said receptacle, a drive connection between said cam drive means and said exhauster, a waste tank mounted on said platform, and a flow connection between the delivery of said exhauster and the interior of said waste tank, said waste tank having an opening at its top to expose the interior of said waste tank to the atmosphere.

13. A machine for testing the injectors or nozzles of compression-ignition engines, comprising a liquid feed pump, a cam for operating the pump, means for driving the cam at a steady speed of rotation, a support for holding an injector to be tested to expose to view the spray that issues from the injector, means for connecting said pump to an injector held by said support, a receptacle for the reception of the spray from an injector undergoing test, an air exhauster and means for driving same, and a connection between the said receptacle and the intake of said air exhauster to draw air and spray liquid through said receptacle.

14. A machine according to claim 13, said connection between the receptacle and the intake of said air exhauster comprising an elbow having the bend thereof arranged lowermost, and a drain-off at the bottom of the bend for such spray liquid as accumulates in the bend.

LESLIE HARTRIDGE.

REFERENCES CITED

The following references are of record in the file of this patent:

UNITED STATES PATENTS

| Number | Name | Date |
|---|---|---|
| 1,962,174 | Christman | June 12, 1934 |
| 2,183,189 | Gormley | Dec. 12, 1939 |
| 2,483,637 | Hawthorne et al. | Oct. 4, 1949 |
| 2,517,766 | Cole | Aug. 8, 1950 |

FOREIGN PATENTS

| Number | Country | Date |
|---|---|---|
| 859,341 | France | Dec. 16, 1940 |
| 629,681 | Great Britain | Sept. 26, 1949 |